(12) United States Patent
Erikson

(10) Patent No.: US 8,985,620 B2
(45) Date of Patent: Mar. 24, 2015

(54) STEERABLE WHEELBARROW

(71) Applicant: Thomas L. Erikson, Rexburg, ID (US)

(72) Inventor: Thomas L. Erikson, Rexburg, ID (US)

(*) Notice: Subject to any disclaimer, the term of this patent is extended or adjusted under 35 U.S.C. 154(b) by 0 days.

(21) Appl. No.: 14/015,585

(22) Filed: Aug. 30, 2013

(65) Prior Publication Data

US 2014/0001720 A1    Jan. 2, 2014

Related U.S. Application Data

(63) Continuation-in-part of application No. 13/456,000, filed on Apr. 25, 2012, now Pat. No. 8,550,490.

(51) Int. Cl.
*B62B 1/00* (2006.01)
*B62B 1/18* (2006.01)

(52) U.S. Cl.
CPC .. *B62B 1/186* (2013.01); *B62B 1/00* (2013.01)
USPC ......................................... 280/659; 280/43.1

(58) Field of Classification Search
USPC ............ 280/43.1, 47.315, 62, 653–654, 79.2, 280/659; 188/19–20
See application file for complete search history.

(56) References Cited

U.S. PATENT DOCUMENTS

| 2,492,157 | A |   | 12/1949 | La Riviere |
|---|---|---|---|---|
| 3,066,945 | A |   | 12/1962 | Prescott |
| 4,767,128 | A |   | 8/1988 | Terhune |
| 4,854,601 | A | * | 8/1989 | Herndon ................... 280/47.31 |
| 5,924,708 | A | * | 7/1999 | Bisaillon et al. ........... 280/47.26 |
| 7,316,413 | B2 |   | 1/2008 | Beaudoin |
| 7,934,728 | B2 |   | 5/2011 | Strobel |
| 2004/0238241 | A1 | * | 12/2004 | Mitchell, Jr. ................ 180/19.3 |

* cited by examiner

*Primary Examiner* — John Walters
*Assistant Examiner* — James Triggs
(74) *Attorney, Agent, or Firm* — Schmeiser, Olsen & Watts LLP

(57) ABSTRACT

A steerable wheelbarrow is described which includes two handles coupled to a tray and two legs coupled to the handles. A mount is coupled to the handles. A pivot is coupled to the mount at an angle between vertical and horizontal. An offset sleeve is rotatably coupled to the pivot. An axle is coupled to an outer diameter of the offset sleeve. At least one wheel is coupled to the axle. A pivot support is coupled to the pivot and to the mount. When the offset sleeve is positioned with the axle coupled to a distal side of the offset sleeve, the axle rotates and when the offset sleeve is positioned with the axle coupled to a proximal side of the offset sleeve, the axle's rotation is limited. The offset sleeve may be rotated in order to switch the side of the offset sleeve to which the axle is coupled.

19 Claims, 11 Drawing Sheets

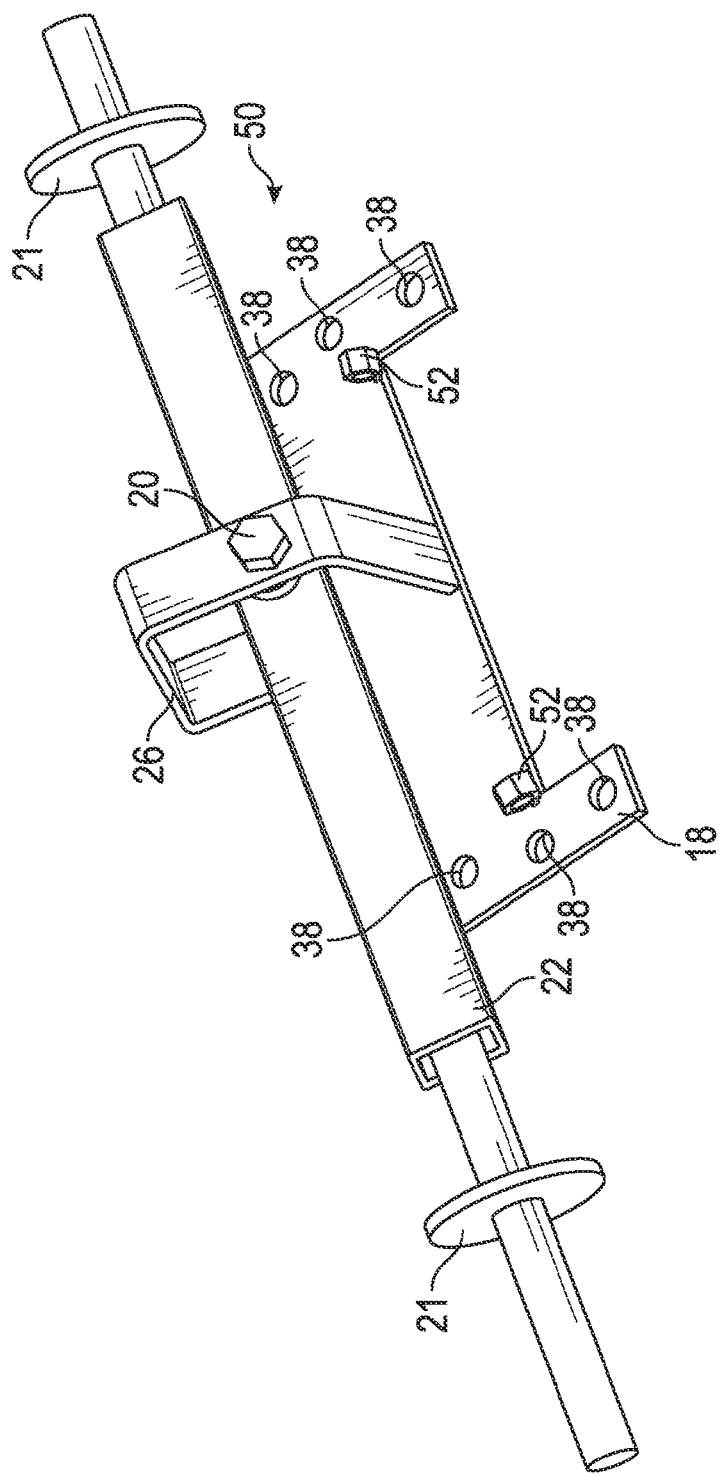

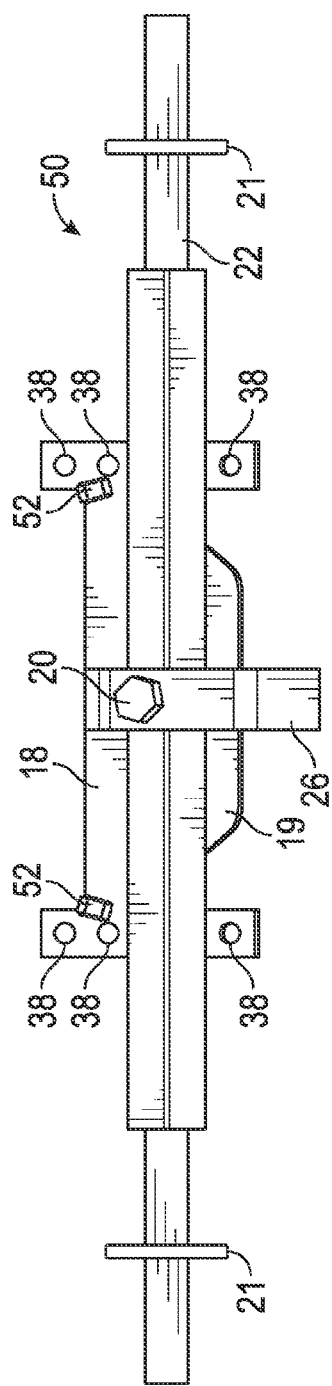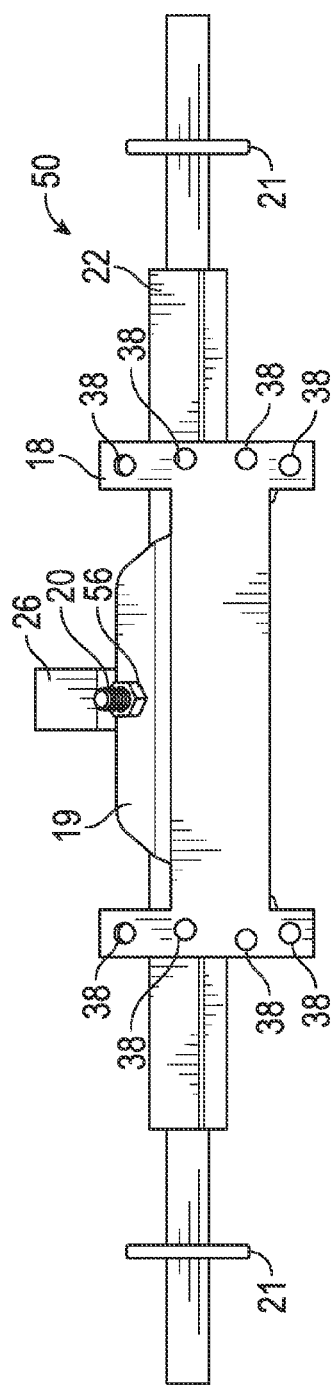

STEERABLE WHEELBARROW

CROSS-REFERENCE TO RELATED APPLICATION

The present application is related to and claims priority to prior U.S. patent application Ser. No. 13/456,000, entitled "STEERABLE WHEELBARROW", filed Apr. 25, 2012 which application is incorporated herein by reference.

BACKGROUND OF THE INVENTION

1. Technical Field

This invention relates to a wheelbarrow with a pivoting axle that can be easily changed to a stationary or almost stationary axle when desired.

2. Background Art

Wheelbarrows have been around for centuries. There are reports of wheelbarrows being used in China during the second century A.D. Wheelbarrows also appear to have existed in Ancient Greece and possibly Rome.

Typically a wheelbarrow consists of a tray or container into which heavy loads are placed. The tray is supported by a single wheel and has two handles which can be used to propel and steer the wheelbarrow.

These traditional wheelbarrows are often difficult to steer or maneuver, particularly over rough ground. Adding a heavy load to one of these wheelbarrows makes it even more difficult to steer. Often, a wheelbarrow may tip over when the user is trying to turn it. If the wheelbarrow is filled with a substance such as a liquid, spilling may occur when the wheelbarrow is pushed over rough ground.

More modern wheelbarrows often have two wheels positioned towards the front of the tray. Using two wheels helps to make the wheelbarrow more stable, though rough terrain is still an issue. However, using two wheels does not make the wheelbarrow easier to steer. In fact, the addition of the second wheel may make the wheelbarrow even harder to steer.

In the past, people have attempted to make wheelbarrows more maneuverable or more stable. The problem is that they never managed to create a wheelbarrow that was both more maneuverable and more stable. The prior art contains many examples such as U.S. Pat. No. 2,492,157 which has a steering mechanism that turns the wheel of the wheelbarrow when a user bends the handle at a hinge. U.S. Pat. No. 5,924,708 is similar in that movement of the wheel or wheels of the wheelbarrow is controlled by the user turning a handle. These wheelbarrows, though more maneuverable, are still unstable on rough terrain.

U.S. Pat. No. 7,934,728 describes a wheelbarrow that has a horizontal pivot point around which the axle rotates in order to compensate for rough terrain. This invention, though it may be more stable, is as hard or harder to steer as a standard wheelbarrow.

Accordingly, what is needed is a wheelbarrow that is stable enough to allow the user to move spillable items while also being easy to steer or maneuver.

DISCLOSURE OF THE INVENTION

The steerable wheelbarrow, as disclosed hereafter in this application, is easily maneuverable while also being stable. The axle of the steerable wheelbarrow may also be reversed in order to change the wheelbarrow from a steerable wheelbarrow to a wheelbarrow with a substantially stationary axle.

In particular embodiments, a wheelbarrow may include a tray with two handles coupled to it. At least one leg may be coupled to the handles. A mount may also be coupled to the handles. A pivot may be coupled to the mount, wherein the pivot may be coupled to the mount at an angle between vertical and horizontal. An offset sleeve may be rotatably coupled to the pivot. An axle may be coupled to the offset sleeve. At least one wheel may be coupled to the axle. A pivot support may be coupled to the pivot, wherein the pivot support may also be coupled to the mount. When the offset sleeve is positioned with the axle coupled to a distal side of the offset sleeve, the axle rotates with respect to the pivot; and when the offset sleeve is positioned with the axle coupled to a proximal side of the offset sleeve, the axle's rotation is limited with respect to the pivot.

Alternate embodiments of a wheelbarrow may include a tray with a front end and a user end. Two braces may be coupled to the tray at a location near the front end of the tray. Two handles may each be coupled to the tray at a location near the user end of the tray and each handle may also be coupled to one of the two braces. Two legs may each be coupled to one of the two handles. A mount may be coupled to both of the two handles at a location near the front end of the tray. A pivot may be coupled to the mount wherein the pivot further includes at least two ends and is coupled to the mount at a location near one of the at least two ends of the pivot. The pivot may be coupled to the mount at an angle approximately 30 degrees less than vertical. An offset sleeve may be rotatably coupled to the pivot. An axle may be coupled to the offset sleeve wherein the axle has two ends. Two wheels may be coupled to the axle at a location near each of the two ends of the axle. A pivot support may be coupled to the pivot wherein the pivot support is coupled to the pivot at a location near the one of the at least two ends of the pivot that is not coupled to the mount. The pivot support is also coupled to the mount.

Embodiments of an axle assembly as used in a wheelbarrow may include a mount. A pivot further includes a first and a second end and wherein the first end may be coupled to the mount. The pivot may be coupled to the mount at an angle between vertical and horizontal. An offset sleeve may be rotatably coupled to the pivot at a location between the first and the second end of the pivot. An axle may be fixedly coupled to an outer diameter of the offset sleeve. A pivot support may be coupled to the second end of the pivot and to the mount.

The foregoing and other features and advantages of the steerable wheelbarrow will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and:

FIG. 5 is an isometric view of an axle assembly for use on a steerable wheelbarrow;

FIG. 6 is a bottom view of an axle assembly for use on a steerable wheelbarrow;

FIG. 7 is a top view of an axle assembly for use on a steerable wheelbarrow;

DESCRIPTION OF THE INVENTION

Figure 1:
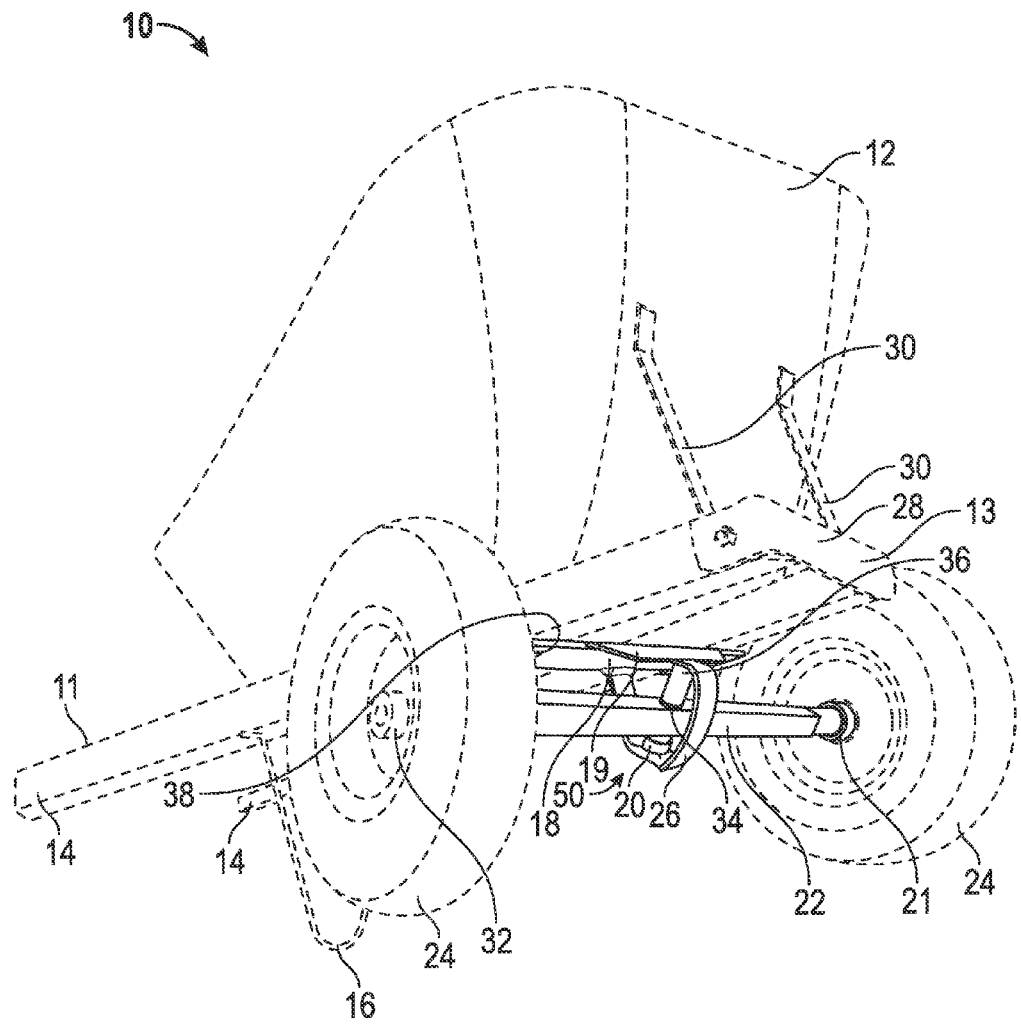
FIG. 1 is an isometric view of a steerable wheelbarrow.
Figure 2:
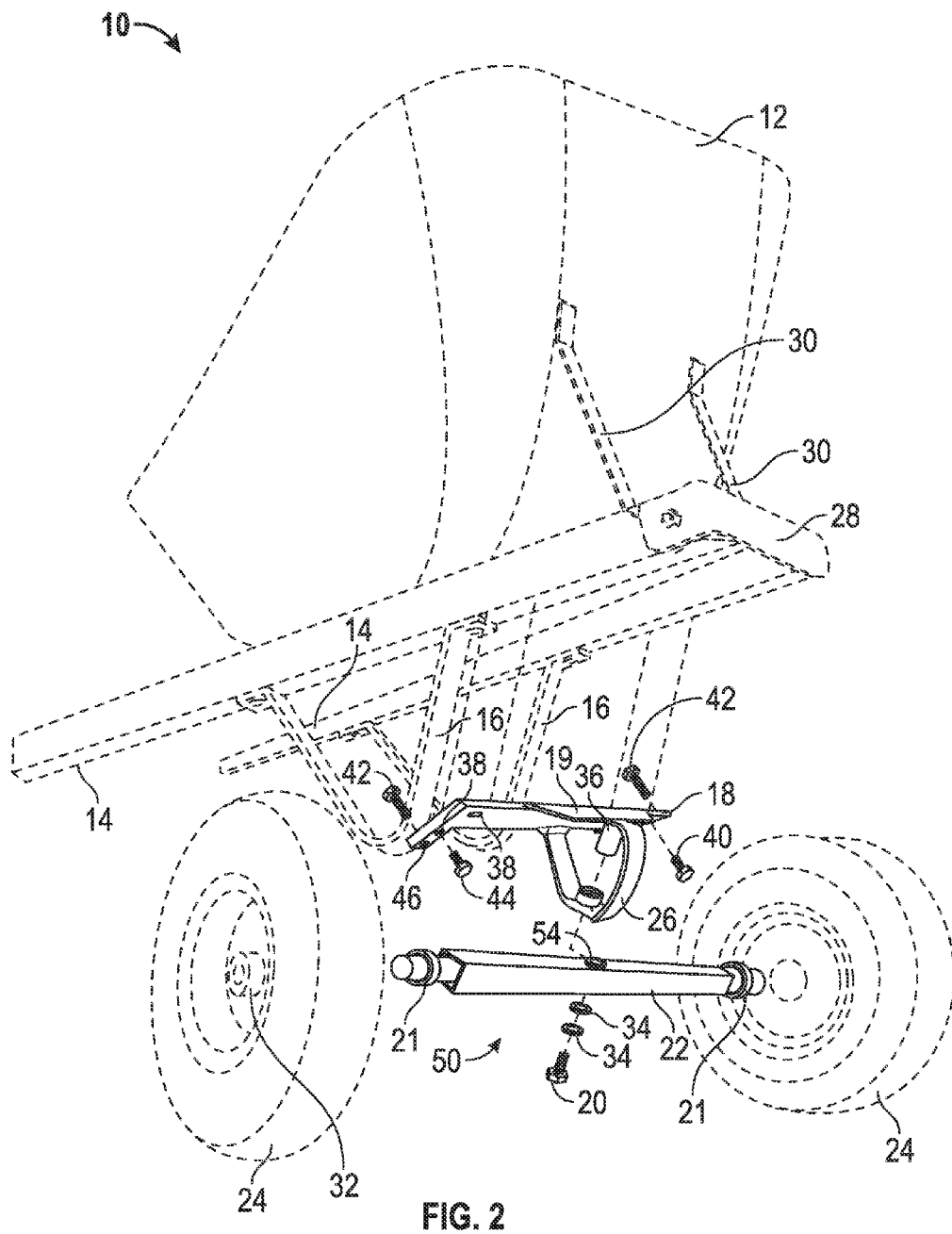
FIG. 2 is an exploded view of a steerable wheelbarrow.
Figure 3:
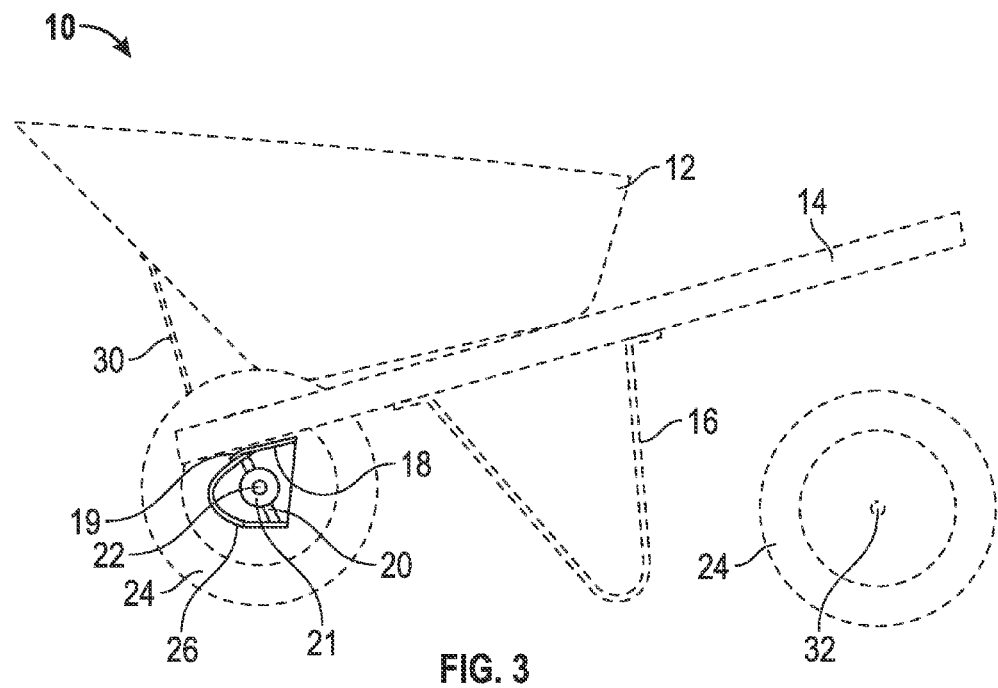
FIG. 3 is a partially exploded side view of a steerable wheelbarrow.

As discussed above, embodiments of the present invention relate to a steerable wheelbarrow. In particular, a wheelbarrow which allows a user to more easily maneuver or steer the wheelbarrow and which allows the wheels on the wheelbarrow to move up and down in order to compensate for rough terrain in order to prevent the contents of the wheelbarrow from spilling. Additional embodiments of the present invention, include an axle which may be reversed in order to allow the user to change the wheelbarrow from a steerable wheelbarrow to a wheelbarrow with a fixed or substantially fixed axle. Generally, a steerable wheelbarrow comprises a tray, at least two handles, a mount, a pivot, an axle, at least one wheel and a pivot support.

FIGS. 1-4 illustrate a steerable wheelbarrow 10. The steerable wheelbarrow 10 comprises a tray 12. The tray 12 of the wheelbarrow 10 may be formed from wood, plastic, metal or the like and may be formed in any shape that will contain items carried in the wheelbarrow 10. Typically a wheelbarrow tray 12 is formed as a kind of bucket which is shallower at one end than the other. The shallow end of the bucket is positioned nearest the user or at the user end of the wheelbarrow 10. The user end 11 of the wheelbarrow 10 is the end closest to a user when the user is pushing the wheelbarrow 10. The deeper end of the tray 12 is positioned at a front end 13 of the wheelbarrow 10. The front end 13 of the wheelbarrow 10 is the end of the wheelbarrow 10 farthest away from the user when the user is pushing the wheelbarrow 10.

A steerable wheelbarrow 10 may also comprise at least one handle 14. A steerable wheelbarrow 10 will typically have two handles 14 configured similarly to a standard wheelbarrow. The handles 14 on the wheelbarrow 10 extend from the user end 11 of the wheelbarrow 10 to the front end 13 of the wheelbarrow 10. The handles 14 are coupled to the tray 12 of the wheelbarrow 10, with the tray 12 coupled towards the front end 13 of the handles 14. The handles 14 allow the user of the wheelbarrow 10 to lift the wheelbarrow 10 and to maneuver the wheelbarrow 10.

The front of the handles 14 are hooked together by a handle connecter 28. The handle connector 28 helps to hold the handles 14 in position. The handle connector 28 is typically a strip of metal with two mostly right angles located at each of the ends of the strip of metal. The right angles are coupled around the end of the handles 14 of the wheelbarrow 10 positioned at the front end 13 of the wheelbarrow 10.

Coupled to the bottom of the handles 14 is at least one leg 16. The legs 16 on a wheelbarrow 10 allow the wheelbarrow to sit with the tray 12 in a relatively level positioned while the user is not pushing the wheelbarrow 10. Some typical wheelbarrows have one leg 16 which couples to each of the handles 14 on the wheelbarrow. This type of leg 16 is formed from a strip of metal bent into the shape of a rectangle with one missing side. The open side is the side that will be coupled to the handles 14 of the wheelbarrow, while the closed side of the rectangle will support the wheelbarrow on the ground. Other typical wheelbarrow legs 16 are formed from two pieces of metal bent into a triangle with a missing side. The open side of the triangle is coupled to the handle 14 of the wheelbarrow. One triangle is coupled to each of the handles 14.

At least one brace 30 may be coupled to the handles 14 of the wheelbarrow. In typical wheelbarrow configurations, two braces 30 are used. Each brace is coupled to one of the handles 14 of the wheelbarrow at a location towards the front end 13 of the wheelbarrow. The braces 30 are then coupled to the underside of the tray 12 of the wheelbarrow. The braces 30 help to support the tray 12. Braces 30 are typically used on wheelbarrows where the tray 12 is made of plastic. Braces 30 may be formed from straight pieces of metal.

All of the components of a wheelbarrow discussed previously may be coupled together using screws, bolts, nails, adhesives, welding, epoxy, fasteners or the like.

In a steerable wheelbarrow 10 such as those discussed in this disclosure, a unique axle assembly 50 is coupled to the bottom of the handles 14 towards the front end 13 of the wheelbarrow 10. The axle assembly 50 is shown as part of the wheelbarrow 10 in FIGS. 1-4. The axle assembly 50 is shown separately from the wheelbarrow in FIGS. 5-8.

The axle assembly 50 as shown in FIGS. 5-8 may be used to replace the axle on any standard wheelbarrow in order to convert that wheelbarrow to a steerable wheelbarrow 10. This is done by coupling the axle assembly 50 to the handles 14 on the standard wheelbarrow at a location approximately the same as where the original wheels were located.

The axle assembly 50 comprises, includes or contains a mount 18. This mount 18 is simply a mounting plate that allows the axle assembly 50 to be coupled to the bottom of the wheelbarrow handles 14. The mount 18 as shown in the figures is a metal plate which may be approximately $3/16$ to $3/4$ of an inch thick, however the mount 18 may be made from any material that is strong enough to prevent the axle assembly 50 from being torn from the bottom of the wheelbarrow 10 when the wheelbarrow is being used. The mount 18 may also be as thick or thin as needed. The mount 18 is shaped like a simple rectangle. Towards the front of the mount 18 is a trapezoidal piece of material 19 which is coupled to the rectangle at an angle. This angle is somewhere between horizontal and vertical, however for preferred arrangements it is likely that the trapezoidal piece of material 19 is coupled to the rectangular piece of material at an angle of approximately 30 degrees below horizontal.

Though, for the purpose of this illustration, the pieces of material are rectangular and trapezoidal, they may be formed in any shape desired.

Coupled to the sides of the rectangular piece of the mount 18 are two longer rectangular pieces of material. These longer rectangular pieces are placed so as to allow the mount 18 to be coupled to the handles 14 of the wheelbarrow 10.

The pieces of the mount 18 may be coupled with adhesives, welding, fasteners or the like. Typically if the mount 18 is formed from metal, the pieces will be coupled by welding.

Along the sides of the mount 18 are coupling holes 38 which allow the metal mount 18 to be coupled to the wooden handles 14 of the wheelbarrow 10. These holes 38 allow couplers 40 to be placed through the mount 18 and into the handles 14. Typical couplers 40 may include bolts, wood screws, nails or the like. The mount 18 may have as few or as many coupling holes 38 as needed to securely fasten the mount 18 to the wooden handles 14 of the wheelbarrow 10.

Attached to the trapezoidal piece of material 19 on the mount 18 is a pivot 20 and a pivot support 26. The pivot 20 is a long cylindrical part around which axle 22 of the axle assembly 50 will rotate. The pivot 20 may be formed from a rod, pin or a bolt as illustrated in the attached figures. The pivot 20 may be formed from any cylindrical piece of material about which axle 22 may rotate.

The pivot 20 is coupled or connected to the mount 18 at the angled trapezoidal piece 19. This positions the pivot 20 at an angle between vertical and horizontal. A typical configuration may have the pivot 20 located at an approximately 30 degree angle less than vertical. Often vertical may be measured as 90 degrees from the plane in which the handles 14 lie. However, vertical may also simply be perpendicular to the ground. This angle allows the wheels on the end of the axle to pivot forward and backward for steering and up and down for stability.

The pivot support 26 is coupled to a first end of the pivot 20 at the same location that the pivot 20 is coupled to the mount 18. The pivot support 26 is then also coupled to a second end of the pivot 20. The pivot support 26 then continues to where it is coupled to the rectangular section of the mount 18. The pivot support 26 provides stability and support to the pivot 20. The pivot support 26 may be formed from a strip of metal or other strong material. This strip of metal is approximately an inch to two inches in width and may be 3/16 to 1/8 an inch in thickness in this embodiment. In other embodiments, the pivot support 26 may be formed from other shapes, sizes and types of material. The pivot support 26 may be formed in a rounded shape such as the pivot support 26 illustrated in FIGS. 1-4 or it may be formed with square angles such as the pivot support 26 illustrated in FIGS. 5-8.

The pivot support 26 and mount 18 may be coupled together by adhesives, welding or the like. The pivot 20 is typically coupled to the mount 18 and pivot support 26 by simply inserting the pivot 20 through pivot holes 54 drilled in the mount 18 and pivot support 26. After inserting pivot 20 through pivot holes 54 and axle 22, pivot opening 60, the end of the pivot 20 then has a pivot nut 56 placed on it, in order to hold the pivot 20 in place. The pivot nut 56 is simply a nut that fits on the pivot 20. In alternate embodiments, the mount 18 may have a threaded opening into which the pivot 20 is inserted and then the pivot nut 56 is not used.

An axle 22 pivots around the pivot 20. The axle 22 may simply be a standard wheelbarrow axle or the like. It may be cylindrical or rectangular with cylindrical ends. The axle may simply be a long straight axle 22 or it may be horseshoe or other shapes. The center of the axle 22 contains a pivot opening 60. The pivot opening 60 is simply an opening through which the pivot 20 is placed. The pivot opening 60 may be formed by drilling a hole through the center of the axle 22 or else a bushing 58 may be inserted through the center of the axle 22 and then the bushing 58 is affixed to the axle 22.

If a bushing 58 is used, the bushing 58 may extend beyond the width of the axle 22 in order to position the axle 22 along the pivot 20. If a bushing 58 is not used, a spacer 36 may be placed along the pivot 20 in order to position the axle 22 appropriately. The spacer 36 may be coupled to the pivot support 26 or it may be simply placed around the pivot 20. Washers 34 may also be used for additional aid in appropriately positioning the axle 22 along the pivot 20.

At each end of the axle 22, a wheel 24 is placed on the axle 22. The wheels 24 rotate freely about the axle 22. In other configurations, one wheel 24 only may be used.

The wheels 24 are held on the axle 22 by wheel nuts 32 which are placed on the axle 22 after the wheels 24. Wheel nuts 32 are typically just standard nuts, pins, caps or other devices that may be used to hold a wheel 24 on an axle 22. A wheel stop 21 may be attached to each end of the axle 22, prior to putting the wheels 24 on the axle 22. The wheel stops 21 prevent the wheel 24 from sliding towards the center of the axle 22. A wheel stop 21 may be any device that would keep the wheel 24 from sliding further on the axle 22. In the FIGs, the wheel stops 21 are large washers which are welded in the proper place on the axle 22.

Figure 4:
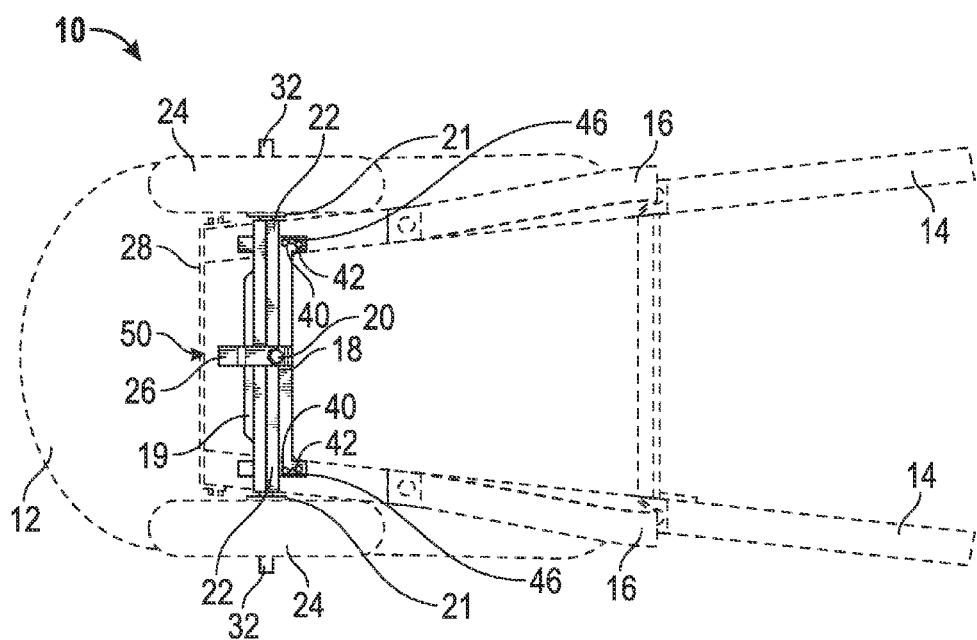
FIG. 4 is a bottom view of a steerable wheelbarrow.
Figure 8:
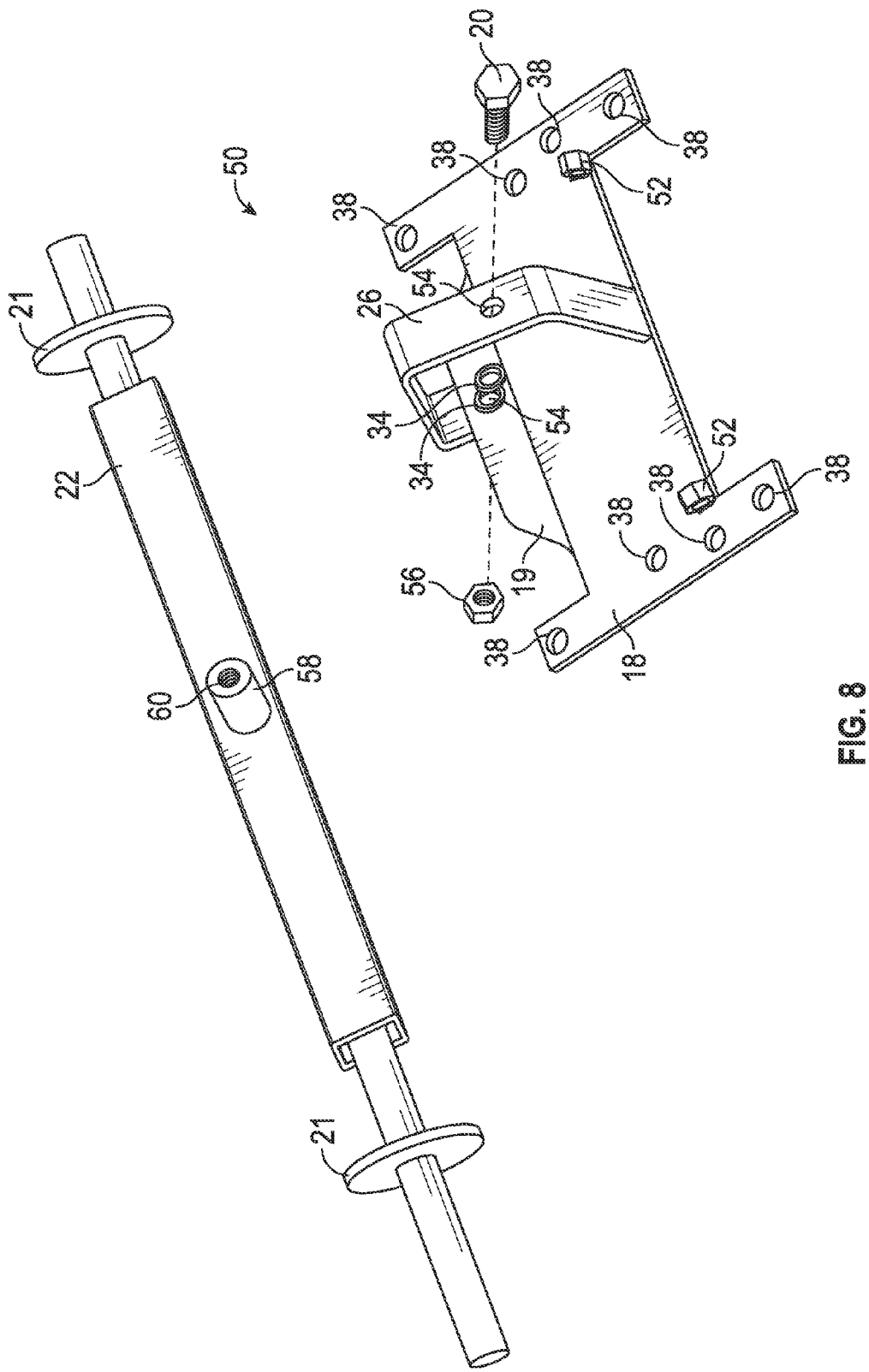
FIG. 8 is an exploded view of an axle assembly for use on a steerable wheelbarrow.
Figure 9:
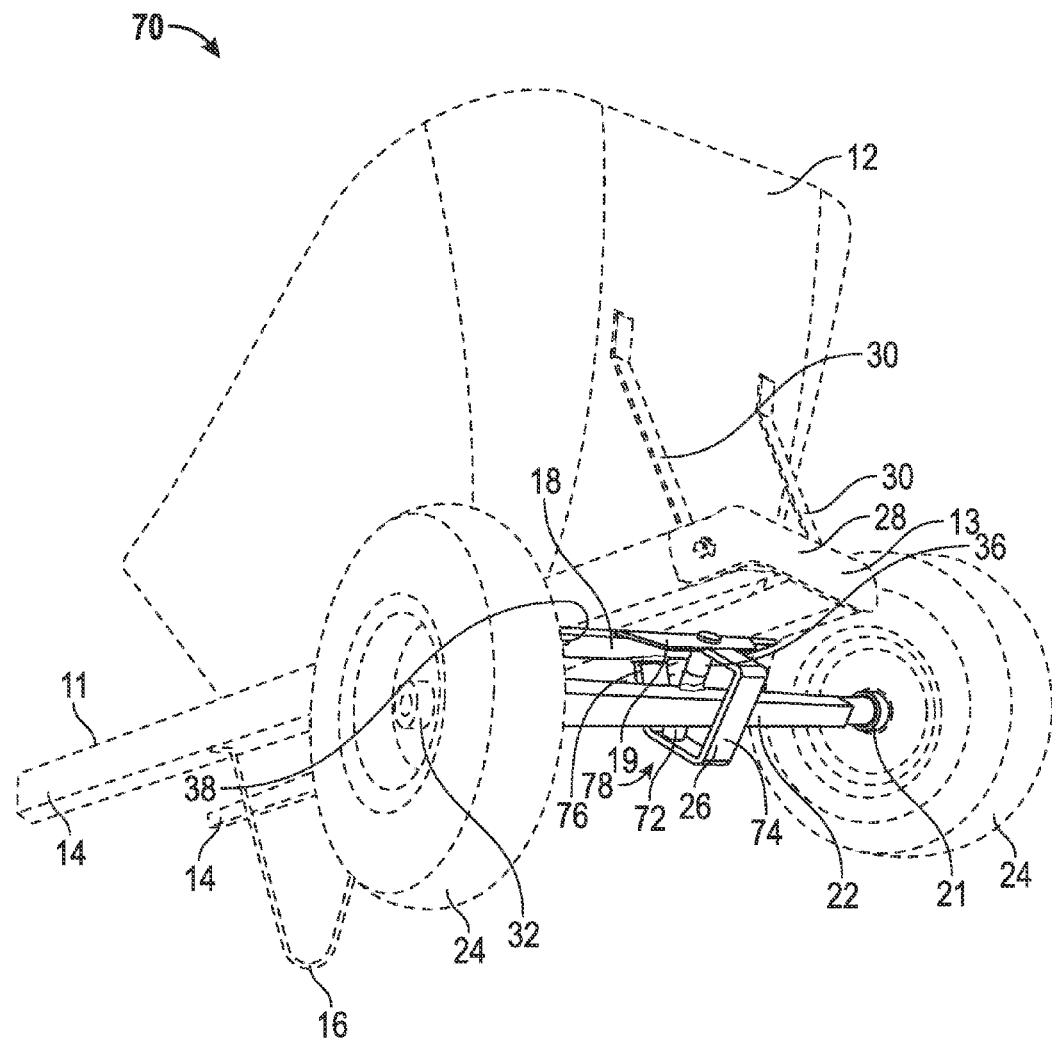
FIG. 9 is an isometric view of an additional embodiment of a wheelbarrow.
Figure 10:
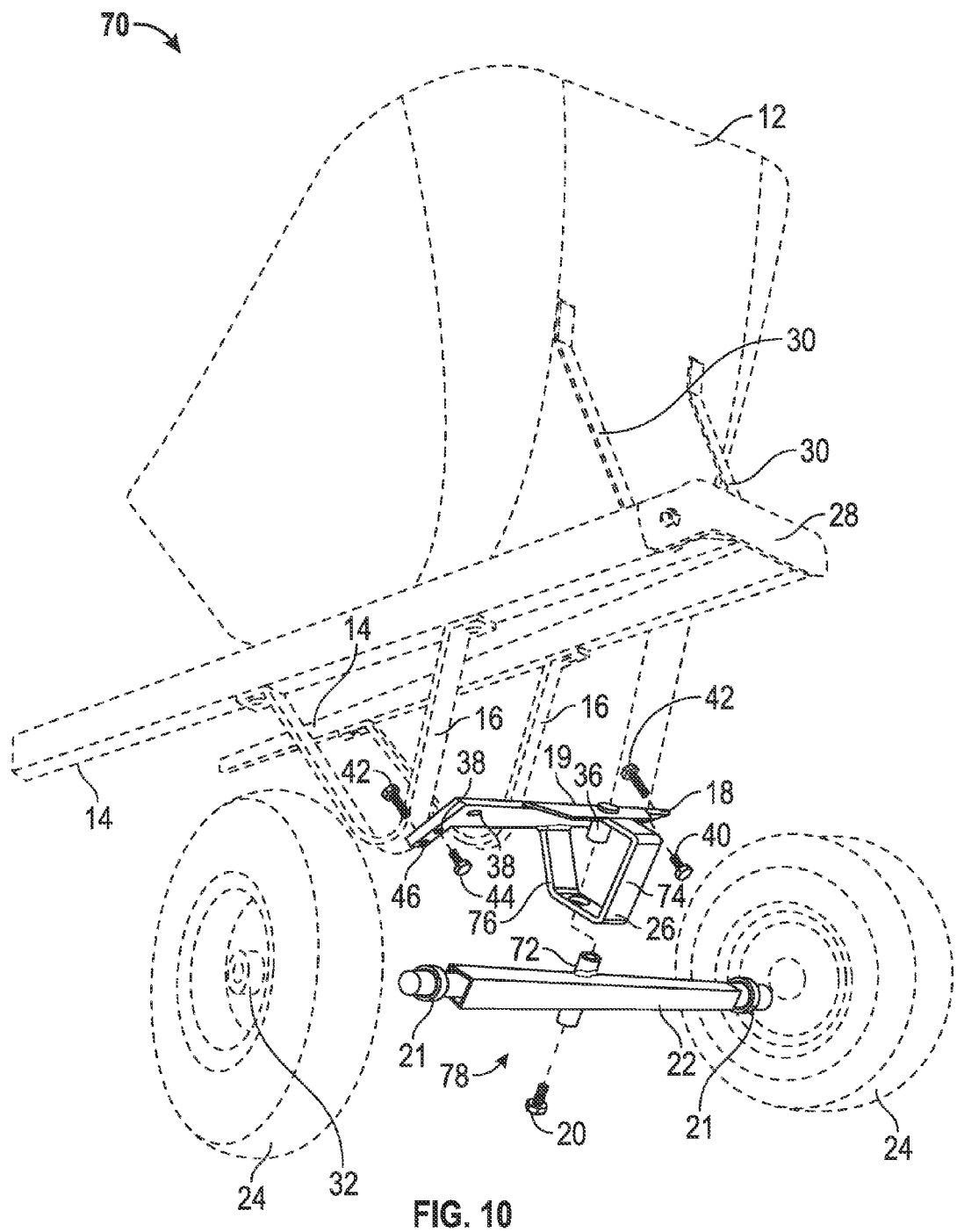
FIG. 10 is an exploded view of an additional embodiment of a wheelbarrow.

In order to prevent the axle 22 from rotating in a complete circle around the pivot 20, which would make using the wheelbarrow 10 difficult, stops may be placed on the mount 18 in order to prevent the axle 22 from rotating more than a predetermined amount. In FIGS. 1-4, the stop is formed by placing a stop coupler 42 through a stop hole 46. The stop coupler 42 may be simply formed from a long screw or bolt. The stop hole 46 is typically the hole on the mount 18 which is positioned closest to the user end of the wheelbarrow. The stop coupler 42 is placed through the stop hole 46 and then the stop coupler 42 is held in place with a nut 44. The stops may also be adjustable in order to allow the user to determine at what point they would like the axle 22 to stop rotating around the pivot 20. The stops may be adjustable by providing multiple stop holes 46 through which the stop coupler 42 could be placed, as shown in FIG. 4. In order to adjust the location of the stops, the user would move the stop coupler 42 from one stop hole 46 to another stop hole 46. The stop holes 46 could also be shaped like extended ellipticals in order to provide multiple locations at which the stop couplers 42 could be fastened.

In the embodiment of axle assembly 50 illustrated in FIGS. 5-8, a stop 52 is coupled to the mount 18 in a position which prevents the axle 22 from rotating around the pivot 20 more than a desired distance. The stop 52 illustrated in these figures is a nut welded to the mount 18. This stop 52, however, could be formed in any configuration or with any material desired.

In alternate embodiments, a steerable wheelbarrow 10 may be configured using one wheel instead of two. In this configuration, the axle may be formed so as to suspend one wheel below the pivot. This would allow the one wheel to pivot to allow the wheelbarrow to be more maneuverable.

In still other embodiments, the angle of the position of the pivot of the steerable wheelbarrow 10 may be adjustable in order to allow the user to determine which angle is best suited to their needs.

In some embodiments of a steerable wheelbarrow, the pivot support may also act as a pivot stop to prevent the axle from rotating in a complete circle.

Additionally, in alternate embodiments, the at least one wheel 24 may be replaced with at least one ski in order to allow the steerable wheelbarrow 10 to be used on snow or ice.

FIGS. 9-13 illustrate an additional embodiment of a wheelbarrow 70. The axle assembly 78 of wheelbarrow 70 includes an offset sleeve 72. The offset sleeve 72 is a cylindrical tube configured to receive pivot 20. The offset sleeve 72 may be formed in any shape or size desired, provided the shape and size allow the pivot 20 to rotate within the offset sleeve 72. The offset sleeve 72 is placed around the pivot 20 and is then coupled to the axle 22. The offset sleeve 72 puts the axle 22 in a position to one side or the other, either the distal side or the proximal side, of the pivot 20 rather than centered on pivot 20 as in the other embodiments.

The axle 22 is coupled to the outside diameter of the offset sleeve 72 in this embodiment. The axle 22 may be coupled to the offset sleeve 72 permanently or removably. The axle 22 may be welded, bolted, glued, epoxied or the like to the offset sleeve 72.

The axle 22 is offset in either a distal direction 74 (FIG. 12) or a proximal direction 76 (FIG. 13) by the offset sleeve 72.

The distal direction 74 is the direction towards the front end of the wheelbarrow 70. The distal direction 74 is also the direction away from the user. The proximal direction 76 is the direction towards the user.

If the axle 22 is offset in the distal direction 74, the axle 22 is allowed to pivot freely around the pivot 20. The axle 22 will pivot until the axle 22 comes into contact with pivot stop 52. In this configuration, the wheelbarrow 70 is a steerable wheelbarrow as described previously.

If the axle 22 is offset in the proximal direction 76, the axle's 22 rotation is limited and the axle 22 is held in a stationary or almost stationary position. The axle 22 is held between the pivot 20 and the pivot stops 52. In this configuration, the axle 22 is fixed in position, in other words, axle 22's rotation is limited with respect to pivot 20, which allows the user to carry loads which would be difficult with a pivoting axle 22. In many instances the axle will have zero rotation in this position, however, it is possible that the axle will rotate less than 10 degrees in either direction.

Figure 12:
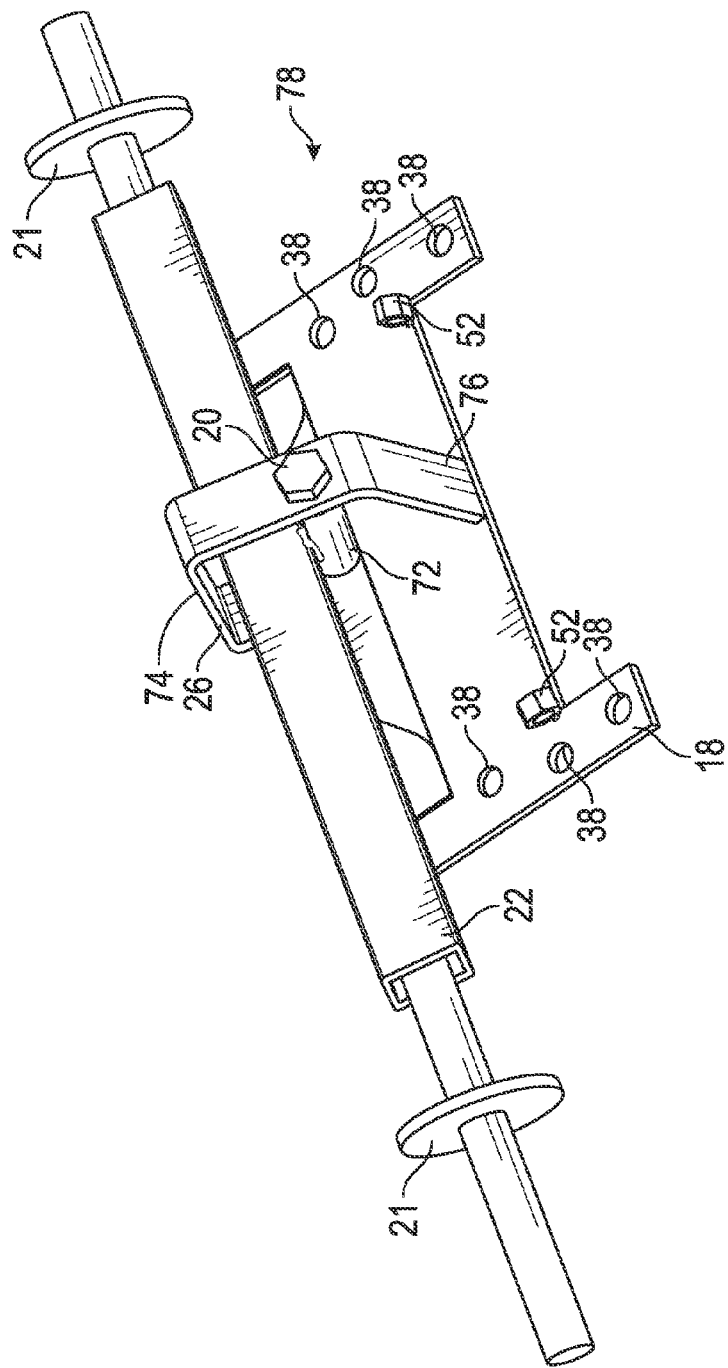
FIG. 12 is an isometric view of an axle assembly with an axle offset in a distal direction for use on an additional embodiment of a wheelbarrow.
Figure 13:
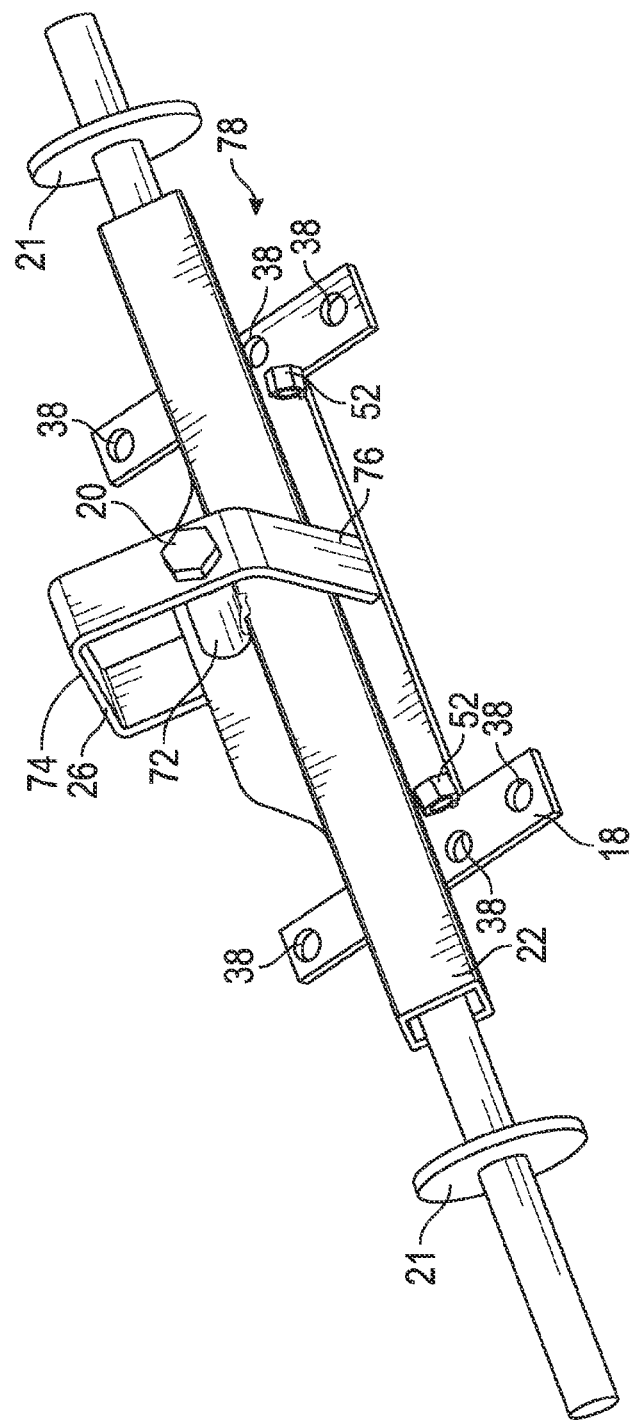
FIG. 13 is an isometric view of an axle assembly with an axle offset in a proximal direction for use on an additional embodiment of a wheelbarrow.

In order to switch axle 22 from a distal offset as illustrated in FIG. 12 to a proximal offset as illustrated in FIG. 13, the user removes pivot 20 which may be a bolt, a screw or the like. Once pivot 20 is removed, the user rotates axle 22 so that offset sleeve 72 is either on the proximal side 76 or the distal side 74. Once the offset sleeve 72 is in position, the user inserts pivot 20 through pivot support 26, through offset sleeve 72, through spacer 36, if desired, and into mount 18. Once the pivot 20 is secured, the user may operate the wheelbarrow 70.

If the user desires to switch the axle 22 back from a fixed to a pivoting axle or vice versa, the user simple repeats the above process. In this way, the user may use the same wheelbarrow 70 for many different types of loads.

Figure 11:
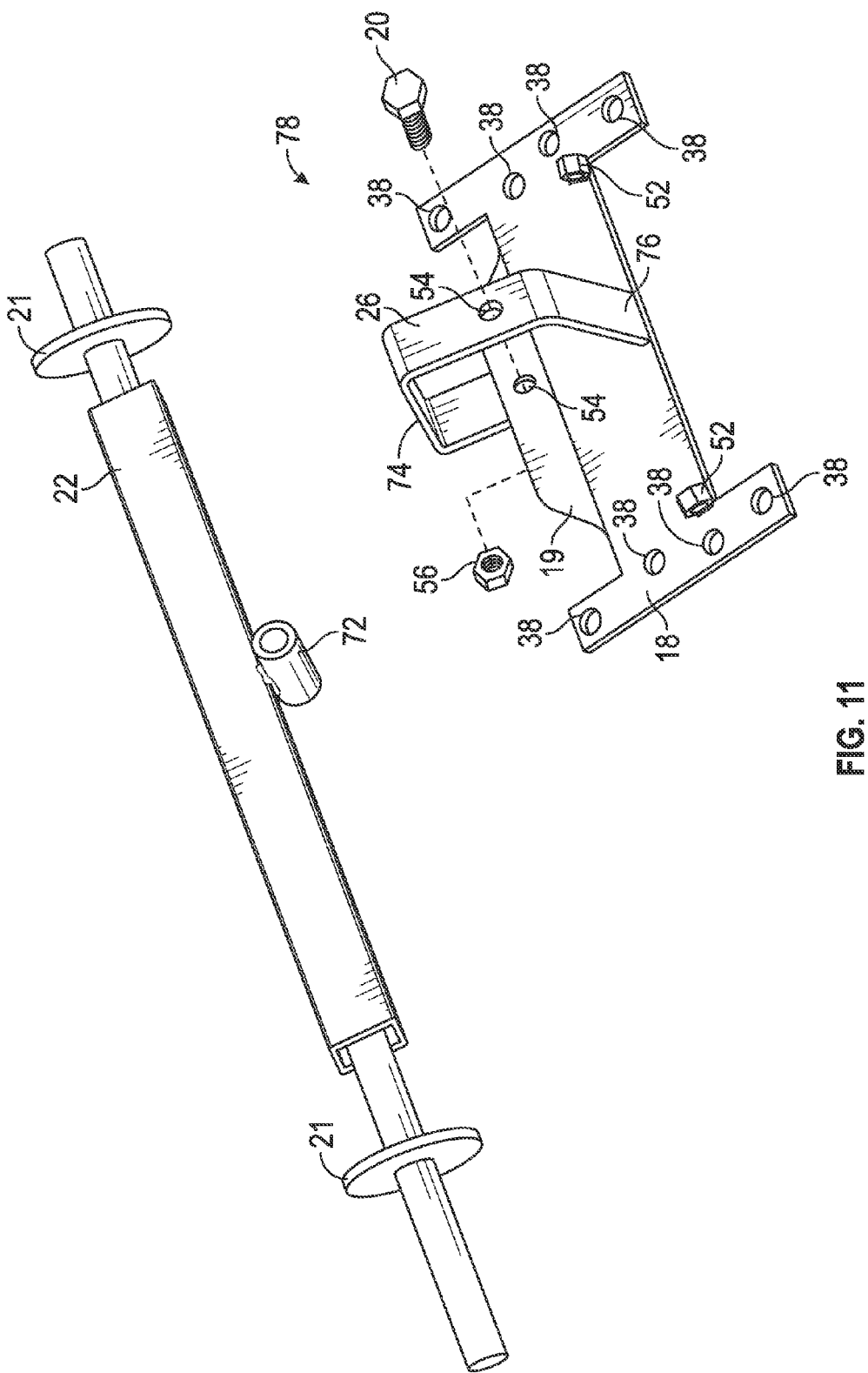
FIG. 11 is an exploded view of an axle assembly for use on an alternative embodiment of a wheelbarrow.

FIG. 11 illustrates an alternative additional embodiment of wheelbarrow 70. In this figure, pivot 20 is a pin which slides through pivot support 26, offset sleeve 72, spacer 36, if desired, and into mount 18. Pivot 20 is held in place by retaining wire 82. Retaining wire 82 is a wire formed into a partial square. Retaining wire 82 may be formed from wire, metal strips, plastic or any other desired material which performs the purpose of securing pivot 20 into position. Retaining wire 82 may be formed from any thickness or type of wire, if wire is used. Retaining wire 82 may also be formed in any shape desired such as a partial circle, partial, rectangle or the like.

One end of retaining wire 82 is rotatably coupled to one end of pivot 20. The other end of retaining wire 82 has an opening through which the other end of pivot 20 may be inserted. When the user is removing pivot 20 from the wheelbarrow 70 in order to reverse the axle 22, the end of retaining wire 82 which has the opening is removed from the end of the pivot 20. The retaining wire 82 is then rotated around the end of the retaining wire 82 which is rotatably coupled to the pivot 20. The pivot 20 can then be removed from the offset sleeve 72 so that the position of the axle 22 may be reversed. Once the axle 22 is in the desired position, the pivot 20 may be reinserted through the pivot support 26, offset sleeve 72, spacer 36, if desired, and into mount 18. Then the retaining wire 82 is rotated so that the open end of the retaining wire 82 may be placed over the end of the pivot 20, thereby securing the pivot 20 into position.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A wheelbarrow comprising:
   a tray;
   two handles coupled to the tray;
   at least one leg coupled to the handles;
   a mount coupled to the handles;
   a pivot coupled to the mount, wherein the pivot is coupled to the mount at an angle between vertical and horizontal;
   an offset sleeve rotatably coupled to the pivot;
   an axle coupled to the offset sleeve;
   at least one wheel coupled to the axle;
   a pivot support coupled to the pivot, wherein the pivot support is also coupled to the mount;
   wherein when the offset sleeve is positioned with the axle coupled to a distal side of the offset sleeve, the axle is allowed to rotate with respect to the pivot.

2. The wheelbarrow of claim 1, wherein the pivot is coupled to the mount at an angle of approximately 30 degrees less than vertical.

3. The wheelbarrow of claim 1, wherein the offset sleeve may be removed from the pivot and rotated in order to move the axle from the distal side to the proximal side of the pivot.

4. The wheelbarrow of claim 1, wherein the mount is coupled to the two handles at multiple locations.

5. The wheelbarrow of claim 1, further comprising at least one adjustable pivot stop.

6. A wheelbarrow comprising:
   a tray further comprising a front end and a user end;
   two braces coupled to the tray at a location near the front end of the tray;
   two handles wherein each handle is coupled to the tray at a location near the user end of the tray and wherein each handle is also coupled to one of the two braces;
   two legs wherein each leg is coupled to one of the two handles;
   a mount coupled to both of the two handles at a location near the front end of the tray;
   a pivot coupled to the mount wherein the pivot further comprises at least two ends and is coupled to the mount at a location near one of the at least two ends of the pivot;

wherein the pivot is coupled to the mount at an angle approximately 30 degrees less than vertical;
an offset sleeve rotatably coupled to the pivot;
an axle coupled to the offset sleeve wherein the axle further comprises two ends;
two wheels coupled to the axle at a location near each of the two ends of the axle;
a pivot support coupled to the pivot wherein the pivot support is coupled to the pivot at a location near the one of the at least two ends of the pivot that is not coupled to the mount; and
wherein the pivot support is also coupled to the mount.

7. The wheelbarrow of claim 6, wherein the axle is coupled to the offset sleeve at a location towards the user end of the tray.

8. The wheelbarrow of claim 6, wherein the axle is coupled to the offset sleeve at a location towards the front end of the tray.

9. The wheelbarrow of claim 6, wherein the location at which the axle is coupled to the offset sleeve may be switched from a location towards the user end of the tray to a location towards the front end of the tray.

10. The wheelbarrow of claim 9, wherein location at which the axle is coupled to the offset sleeve may be switched by rotating the offset sleeve and the axle with respect to the pivot.

11. The wheelbarrow of claim 9, wherein when the axle is coupled to the offset sleeve at a location towards the user end of the tray, the axle's rotation around the pivot is limited.

12. The wheelbarrow of claim 9, wherein when the axle is coupled to the offset sleeve at a location towards the front end of the tray, the axle rotates around the pivot.

13. An axle assembly for a wheelbarrow comprising:
a mount;
a pivot further comprising a first and a second end, wherein the first end is coupled to the mount;
wherein the pivot is coupled to the mount at an angle between vertical and horizontal;
an offset sleeve rotatably coupled to the pivot at a location between the first and the second end of the pivot;
an axle fixedly coupled to an outer diameter of the offset sleeve; and
a pivot support coupled to the second end of the pivot and to the mount.

14. The assembly of claim 13, wherein the pivot is coupled to the mount at an angle of 30 degrees less than vertical.

15. The assembly of claim 13, wherein the pivot is removably coupled to the pivot support and the mount.

16. The assembly of claim 15, wherein when the pivot is removed the offset sleeve may be rotated to alter a direction to which the axle is offset by the offset sleeve.

17. The assembly of claim 12, wherein the offset sleeve is rotatably coupled to the pivot with a bearing.

18. The assembly of claim 16, wherein the axle's rotation is limited when the axle is offset by the offset sleeve in a proximal direction.

19. The assembly of claim 16, wherein the axle is allowed to rotate when the axle is offset by the offset sleeve in a distal direction.

* * * * *